US009720597B2

(12) United States Patent
Li et al.

(10) Patent No.: US 9,720,597 B2
(45) Date of Patent: Aug. 1, 2017

(54) SYSTEMS AND METHODS FOR SWAPPING PINNED MEMORY BUFFERS

(71) Applicant: NEC Laboratories America, Inc., Princeton, NJ (US)

(72) Inventors: Cheng-Hong Li, Princeton, NJ (US); Giuseppe Coviello, Plainsboro, NJ (US); Kunal Rao, Plainsboro, NJ (US); Murugan Sankaradas, Dayton, NJ (US); Srihari Cadambi, Princeton Junction, NJ (US); Srimat Chakradhar, Manalapan, NJ (US); Rajat Phull, Redmond, WA (US)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 14/603,813

(22) Filed: Jan. 23, 2015

(65) Prior Publication Data
US 2015/0212733 A1 Jul. 30, 2015

Related U.S. Application Data

(60) Provisional application No. 61/931,331, filed on Jan. 24, 2014.

(51) Int. Cl.
*G06F 12/00* (2006.01)
*G06F 3/06* (2006.01)
*G06F 9/50* (2006.01)

(52) U.S. Cl.
CPC ............ *G06F 3/061* (2013.01); *G06F 3/0656* (2013.01); *G06F 3/0673* (2013.01); *G06F 9/50* (2013.01)

(58) Field of Classification Search
CPC combination set(s) only.
See application file for complete search history.

(56) References Cited

U.S. PATENT DOCUMENTS 9,208,071 B2 * 12/2015 Talagala .............. G06F 12/0246

OTHER PUBLICATIONS

Becchi, et al., "A Virtual Memory Based Runtime to Support Multi-tenancy in Clusters with GPUs," HDPC, Jun. 2012, pp. 97-108.

* cited by examiner

*Primary Examiner* — Matthew Bradley
(74) *Attorney, Agent, or Firm* — Joseph Kolodka

(57) ABSTRACT

Systems and methods for swapping out and in pinned memory regions between main memory and a separate storage location in a system, including establishing an offload buffer in an interposing library; swapping out pinned memory regions by transferring offload buffer data from a coprocessor memory to a host processor memory, unregistering and unmapping a memory region employed by the offload buffer from the interposing library, wherein the interposing library is pre-loaded on the coprocessor, and collects and stores information employed during the swapping out. The pinned memory regions are swapped in by mapping and re-registering the files to the memory region employed by the offload buffer, and transferring data of the offload buffer data from the host memory back to the re-registered memory region.

20 Claims, 4 Drawing Sheets

SYSTEMS AND METHODS FOR SWAPPING PINNED MEMORY BUFFERS

RELATED APPLICATION INFORMATION

This application claims priority to provisional application Ser. No. 61/931,331, filed on Jan. 24, 2014, incorporated herein by reference.

BACKGROUND

Technical Field

The present invention relates to swapping memory buffers, and more particularly, to swapping pinned memory buffers in manycore systems.

Description of the Related Art

A programming model used for manycore coprocessors (e.g., Intel Xeon Phi manycore coprocessors), is an offload model, in which functions suitable to be executed on a manycore coprocessor (e.g., Intel Xeon Phi manycore coprocessor) are executed by the coprocessor, while the remaining functions are computed on a host central processing unit (CPU). The functions computed by the coprocessor may be called "offload" functions. The input and output data of an offload function may be transferred to and from the coprocessor through a Peripheral Component Interconnect Express (PCIe) Bus. To facilitate the data transfer, the data is stored in pinned memory pages on the coprocessor, and thus cannot be swapped out to the host memory during the lifetime of the offload process by an operating system (OS) (e.g., Xeon Phi's OS).

SUMMARY

A method for swapping out and in pinned memory regions between main memory and a separate storage location in a system, including establishing an offload buffer in an interposing library; swapping out pinned memory regions by transferring offload buffer data from a coprocessor memory to a host processor memory, unregistering and unmapping a memory region employed by the offload buffer from the interposing library, wherein the interposing library is preloaded on the coprocessor, and collects and stores information employed during the swapping out. The pinned memory regions are swapped in by mapping and re-registering the files to the memory region employed by the offload buffer, and transferring data of the offload buffer data from the host memory back to the re-registered memory region.

A system for swapping out and in pinned memory regions between main memory and a separate storage location in a system, including a buffer creation module configured to establish an offload buffer; a swapping module configured to swap out pinned memory regions by employing one or more transfer modules configured to transfer offload buffer data from a coprocessor memory to a host processor memory, one or more registration modules configured to unregister a memory region employed by the offload buffer from an interposing library, wherein the interposing library is preloaded on the coprocessor, and is configured to collect and store information employed during the swapping out, and one or more mapper modules configured to unmap the memory region. The swapping module is further configured to swap in pinned memory regions using the one or more mapper modules, wherein the mapper modules are further configured to map the files to the memory region employed by the offload buffer, the one or more registration modules, wherein the registration modules are further configured to re-register the memory region to the library, and one or more transfer modules configured to transfer data of the offload buffer from the host memory back to the re-registered memory region.

A method for swapping out and in pinned memory regions between main memory and a separate storage location in a system, including establishing an offload buffer in an interposing library; swapping out pinned memory regions by transferring offload buffer data from a coprocessor memory to a host processor memory, unregistering and unmapping a memory region employed by the offload buffer from the interposing library, wherein the interposing library is preloaded on the coprocessor, and collects and stores information employed during the swapping out, and truncating files backing the memory region to zero size.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
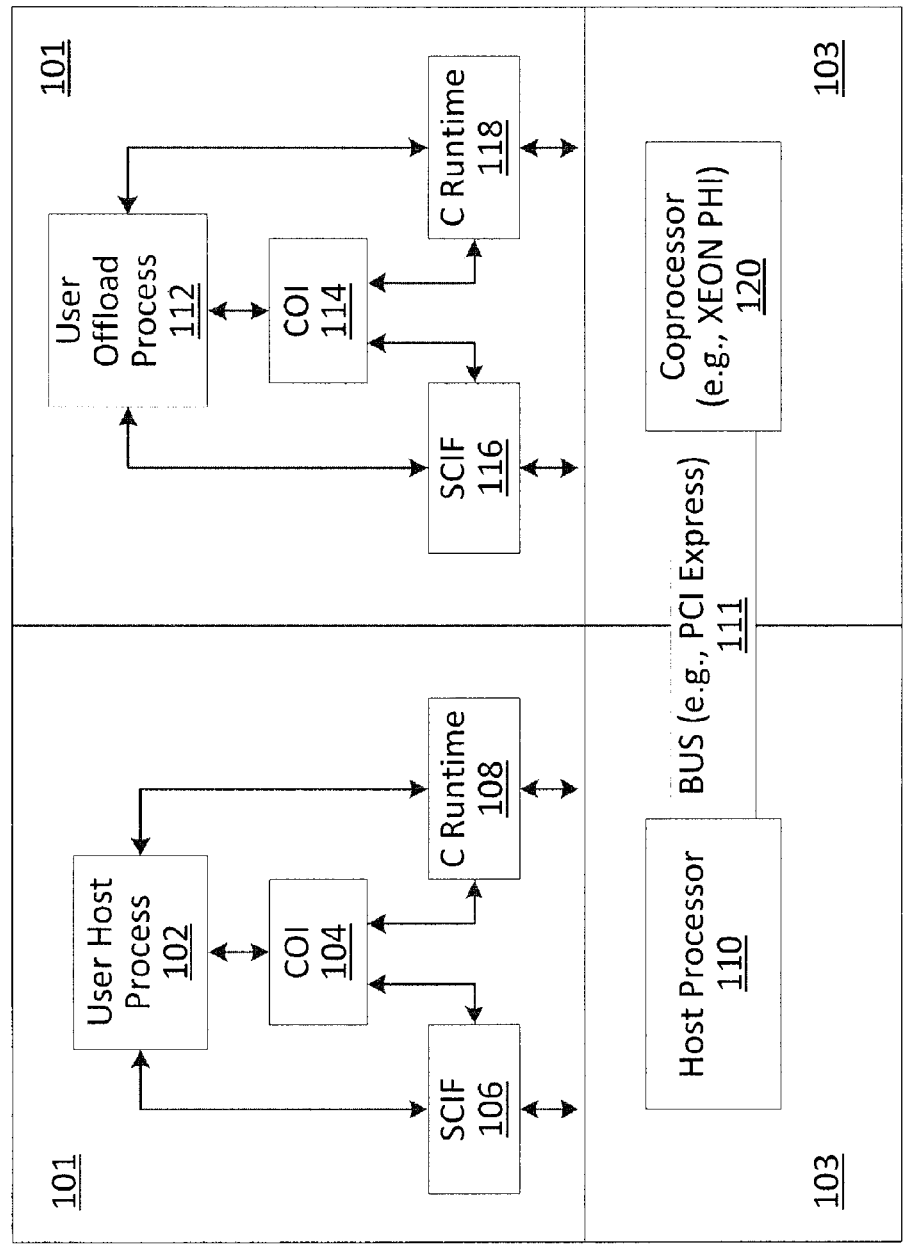
FIG. 1 is a block/flow diagram illustratively depicting a relationship between user processes and runtime libraries on a host and on a coprocessor (e.g., Intel Xeon Phi coprocessor) in accordance with the present principles.

In accordance with the present principles, systems and methods are provided for swapping (e.g., transparently) in and out offload buffers for coprocessors (e.g., Intel Xeon Phi coprocessors). There exist certain situations in which it is desirable to swap out and in buffers as needed. For example, in situations where coprocessor memory may run low, it would be advantageous for memory to be vacated for data that is required shortly by swapping out the input/output buffers that are not currently in use. In one embodiment, a scheduler that may migrate an offload process from one coprocessor (e.g., Xeon Phi) to another coprocessor may be employed according to the present principles to, for example, perform load balancing. The buffers used by the original offload process on the first coprocessor may be "swapped" out first and then "swapped" in to the new offload process running on the second coprocessor.

In one embodiment, applications (e.g., long running applications) may be checkpointed regularly so that the checkpointed processes may be restarted later without losing the computed intermediate results. To restart a process, the checkpointed offload buffers may also be "swapped" in so that the restarted process may continue to use the buffers. A challenge to swapping is that the offload buffers may be pinned memory regions, and therefore cannot be swapped out by the OS's VM system. However, the present principles may be employed for swapping, and may transparently swap in and out offload buffers for coprocessors (e.g., Intel Xeon Phi coprocessors).

In one embodiment, each offload process on a coprocessor (e.g., Intel Xeon Phi coprocessor) may be preloaded to an interposing library that may monitor several key function calls that are made by the offload process to allocate its offload buffers. Through the monitoring of the key functions, the interposing library may then record the number, the size, and the memory locations of the allocated offload buffers. If one or more offload buffers are desired to be swapped out, the interposing library may transfer the data stored in the buffers to the host memory, unpin the offload buffers, and de-allocate their memory. It is noted that the present principles may be employed to deallocate one or more offload buffers while an offload process is still alive.

In one embodiment, to swap in one or more buffers, the interposing library may replay the function calls that were employed to establish the swapped-out buffers so that the offload buffer storage can be re-established at the same memory location on the coprocessor (e.g., Xeon Phi coprocessor). Then the interposing library may copy back the data that was previously copied to the host memory to complete the swap-in process.

It is noted that the swap-in/out system and method for offload buffers on processors (e.g., Intel Xeon Phi processors) according to the present principles includes several advantages over conventional systems and methods. For example, performance optimization may result from increasing process concurrently (e.g., more processes may be scheduled than the physical memory on a processor (e.g., Xeon Phi) is able to accommodate), and from enabling a scheduler to migrate one or more processes from one processor (e.g., Xeon Phi) to another according to embodiments of the present principles. Furthermore, in one embodiment, reliability may advantageously improve by checkpointing and restarting offload processes to protect long running jobs against hardware/software failures.

It is noted that a challenge is that the offload buffers are pinned memory regions, and as such, cannot be swapped out by an OS's Virtual Memory (VM) system. VM systems in modern OS's can swap out/in memory pages to/from a secondary storage device (e.g., hard disk). However, the pinned buffers are not swapped by definition, and thus, are excluded from swapping in a VM system. Conventional studies on General-Purpose Computing on Graphics Processor Units (GPGPUs) provide methods to swap out/in Graphics Processor Units (GPUs), but these approaches cannot be applied to coprocessors (e.g., Intel Xeon Phi coprocessors) because offload buffers allocated on a Xeon Phi coprocessor are persistent during the lifetime of an offload process. Furthermore, in conventional systems, there is no Application Programming Interface (API) in the offload runtime library that can de-allocate an offload buffer while the offload process is still alive.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 1, a block/flow diagram illustratively depicting a relationship between user processes and runtime libraries on a host and on a coprocessor (e.g., Intel Xeon Phi coprocessor) is illustratively depicted in accordance with the present principles is illustratively depicted according to one embodiment of the present principles. In one embodiment, a user host process 102 and a user offload process 112 on the user side 101 may be employed. The offload buffer of a user offload process 112 may be a pinned memory region backed by one or more temporary files. To establish an offload buffer, one or more compiler offload interface (COI) libraries 104, 114 linked by the offload process may first create a temporary file, and/or reuse existing temporary files not mapped to any offload buffer so that the total size of the temporary files is equal to the buffer size used by the offload process 112.

In one embodiment, the COI libraries 104, 114 may map the temporary files into a contiguous memory region in the offload process's 112 virtual memory space. The COI libraries 104, 114 may then call one or more serial control interface (SCIF) libraries 106, 116 and/or one or more C Runtime libraries 108, 118 on the user side 101 for the user host process 102 and/or the user offload process 112. Once the memory region is registered to a library (e.g., SCIF library) 106, 116, it may be pinned, and may be employed as buffers for data transfers (e.g., SCIF (zero-copy) data transfers). One or more host processors 110 may be connected via one or more BUSes (e.g., PCI Express (PCIe) BUS) 111 to one or more coprocessors (e.g., Intel Xeon Phi) 120 on the kernel side 103.

Figure 2:
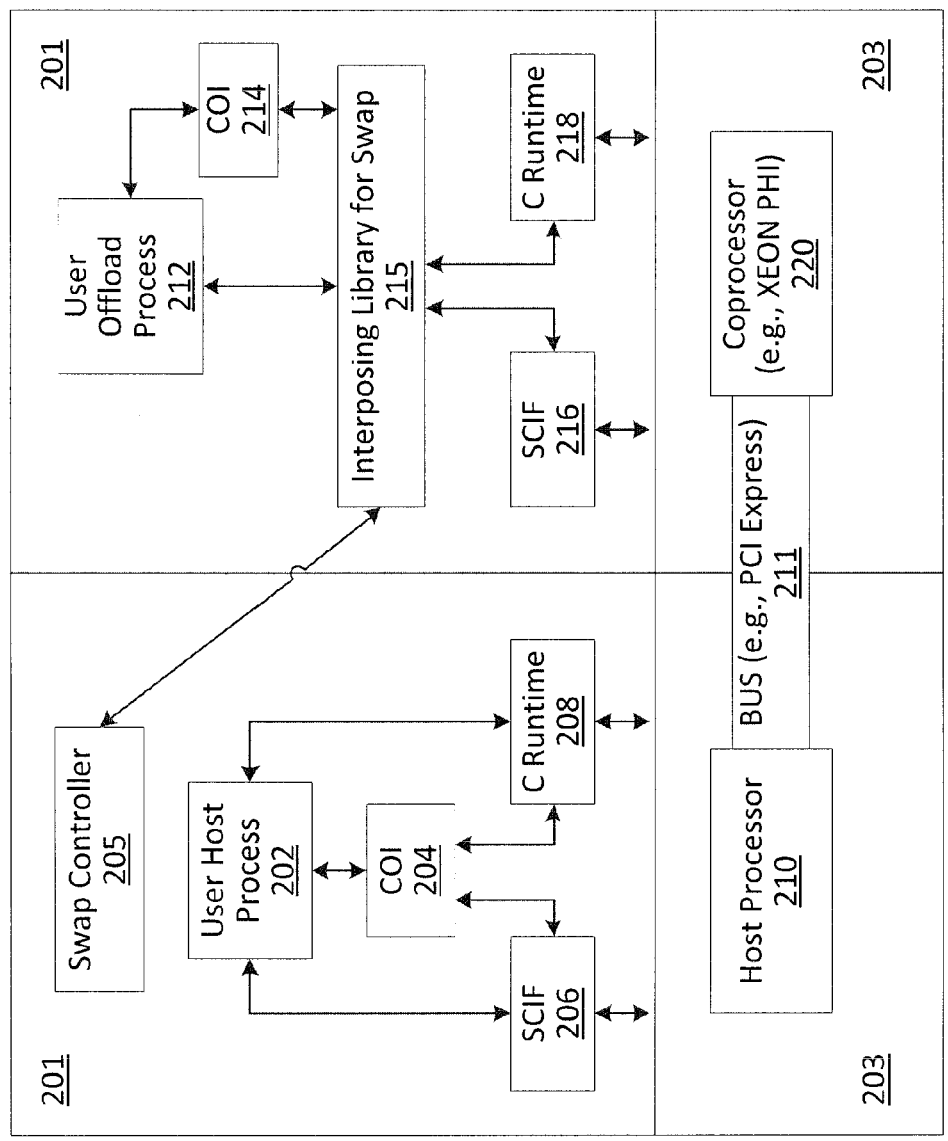
FIG. 2 is a block/flow diagram illustrating a system/method for swapping pinned memory buffers in accordance with the present principles.

Referring now to FIG. 2, a system/method for swapping pinned memory buffers is illustratively depicted in accordance with the present principles. In one embodiment, the COI libraries 204, 214 may map the temporary files into a contiguous memory region in the offload process's 212 virtual memory space. The COI libraries 204, 214 may then call one or more serial control interface (SCIF) libraries 206, 216 and/or one or more C Runtime libraries 208, 218 on the user side 201 for the user host process 202 and/or the user offload process 212. Once the memory region is registered to a library (e.g., SCIF library) 206, 216, it may be pinned, and may be employed as buffers for data transfers (e.g., SCIF (zero-copy) data transfers). One or more host processors 210 may be connected via one or more BUSes (e.g., PCI Express (PCIe) BUS) 211 to one or more coprocessors (e.g., Intel Xeon Phi) 220 on the kernel side 203.

In one embodiment, the system/method according to the present principles may swap out/in pinned offload buffers using a swap controller 205 and an interposing library 215 to collect information employed for swapping during a buffer creation phase on the user side 201. The interposing library may also be referred to as a "swap library" 215.

In one embodiment, the swap library 215 may be employed to intercept several functions, including, for example, one or more functions used to create temporary files (e.g., "mkstemps") to obtain the paths and names of temporary files, one or more functions that map the temporary files to a contiguous memory region (e.g., "mmap") to obtain the memory addresses and size of the buffers, and one or more SCIF register functions (e.g., "scif_register") for handles and window addresses used in SCIF data transfers. For each intercepted function, once the information is recorded, the swap library may employ the same parameters passed into the intercepted function to call the real SCIF library functions 206, 216/C Runtime library functions 208, 218.

In one embodiment, the swap-out and swap-in functions exposed by the swap library may be called by a separate process that controls swap (e.g., "SWAP CONTROL"), and such a process may be a part of a middleware that schedules offload processes and offload execution, a checkpoint-restart mechanism to restart an offload process, etc.

It is noted that although the above configuration and hardware is illustratively depicted, other sorts or configurations and hardware are also contemplated and may also be employed according to the present principles.

Figure 3:
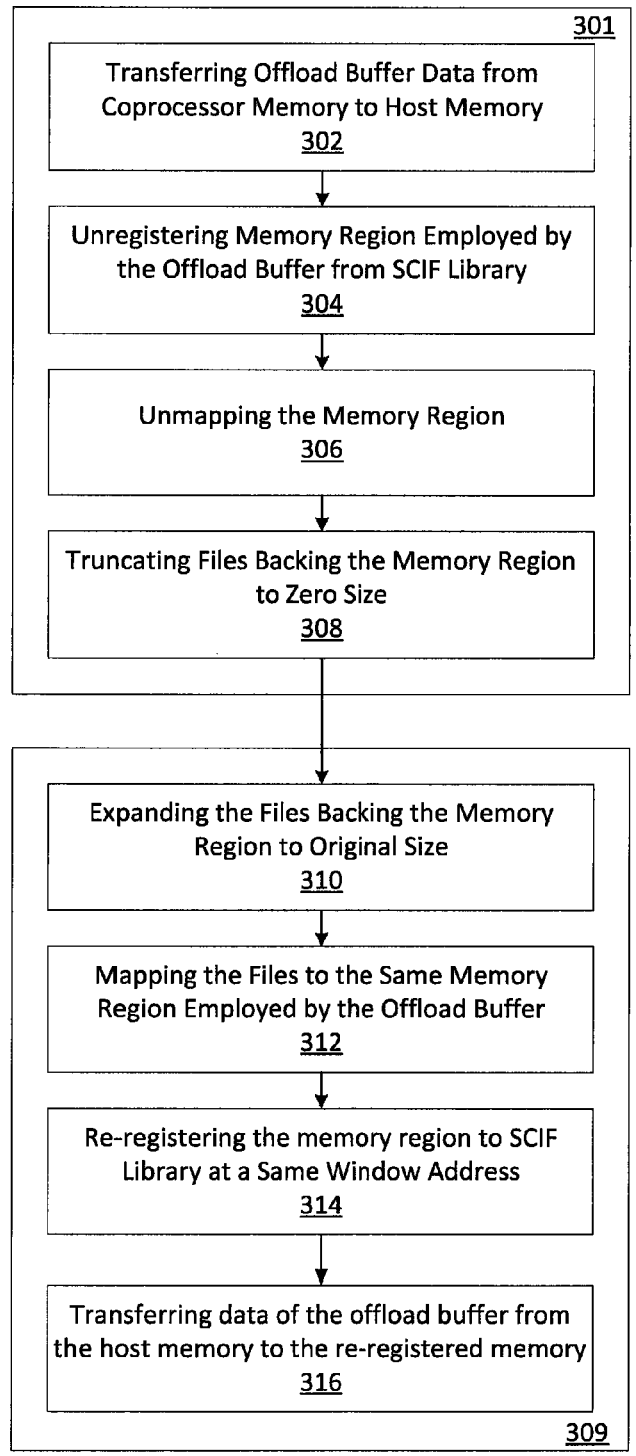
FIG. 3 is a block/flow diagram illustrating a system/method for swapping pinned memory buffers in accordance with the present principles.

Referring now to FIG. 3, a system/method for swapping pinned memory buffers is illustratively depicted in accordance with the present principles. In one embodiment, an interposing library (e.g., swap library) may employ a swap-out function 301 that may be called to swap out an offload buffer. When the swap-out function is called, a swap library and/or a swap controller may perform the following operations in sequence.

In one embodiment, the swap library may transfer data in the offload buffer to be swapped out to the host memory (e.g., the data can be transferred back using SCIF data transfer functions) in block 301. Then the swap-out function may unregister the memory region used by the buffer with SCIF library (e.g., "scif_unregister") in block 304, and may unmap the memory region (e.g., "munmap") in block 306. The swap library and/or swap controller may truncate the file(s) backing the memory region to zero ("ftruncate") in block 308. In this way, the buffer space may be released to a coprocessor OS (e.g., Intel Xeon Phi OS). It is noted that the swap-out function may be called while the offload process is not active, (e.g., the offload process is not executing any offload functions). Once any of its offload buffers are swapped out, the offload process may remain inactive.

In one embodiment, the swap library may symmetrically expose a swap-in function that may be called to swap in an offload buffer that has been swapped out from the host memory to a coprocessor (e.g., Xeon Phi coprocessor). The swap-in function may first re-allocate the memory and its file backing store at the same location with the same size as the offload buffer used before it was swapped out. To do this, the swap library may first expand the temporary file(s) (e.g., those which were shrunk to zero size by the swap-out function) by calling a function (e.g., "ftruncate") in block 310.

The swap-in function may then map these temporary files to the same contiguous memory region in the virtual memory space occupied by the offload buffer before it was swapped out in block 312. The swap-in function may then re-register the memory region with SCIF library (e.g., "scif_register") at the same SCIF window previously used by the offload buffer in block 314. Finally the swap-in function may transfer data of the offload buffer from the host memory back the memory region that is just re-allocated on the Xeon Phi, and may transfer data of the offload buffer from the host memory back to the re-registered memory region in block 316. In one embodiment, after all of the swapped-out buffers are restored, the offload process may resume its execution.

It is noted that although the above functions and steps are illustratively depicted according to the present principles, it is contemplated that other functions and steps may also be employed and/or be executed in any order according to the present principles.

Figure 4:
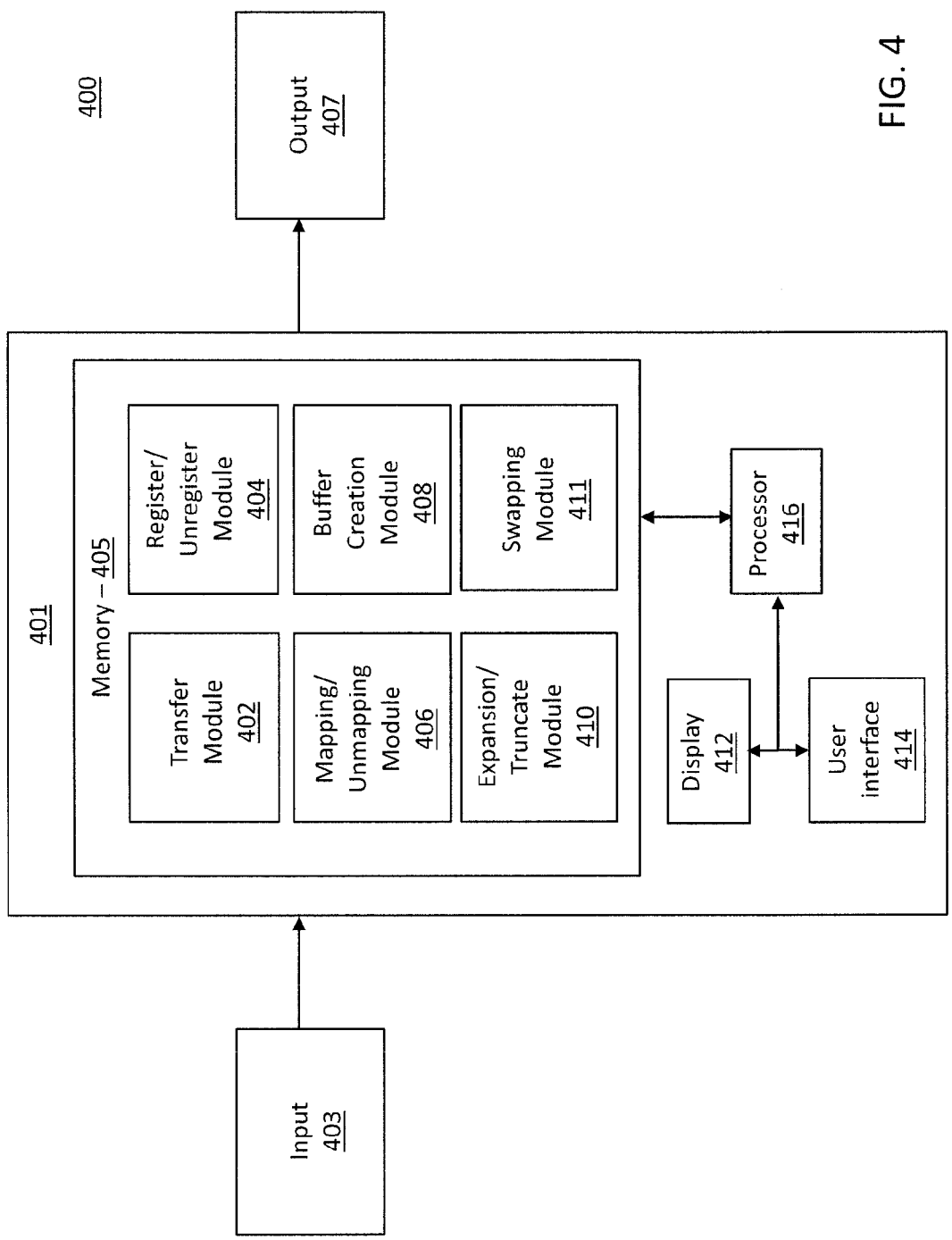
FIG. 4 is a block/flow diagram illustrating a system for swapping pinned memory buffers in accordance with the present principles.

Referring now to FIG. 4, a system for swapping pinned memory buffers 400 is illustratively depicted in accordance with one embodiment of the present principles. The system 400 may include a workstation or system 401. The system 401 may be a general purpose, or special purpose computer, and preferably includes one or more processors and/or coprocessors 416 and memory 405 for storing applications, modules, and other data.

In one embodiment, the system 401 may include one or more displays 412 for viewing. The displays 412 may permit a user to interact with the system 401 and its components and functions. This may be further facilitated by a user interface 414, which may include a mouse, joystick, or any other peripheral or control to permit user interaction with the system 401 and/or its devices. It should be understood that the components and functions of the system 401 may be integrated into one or more systems or workstations.

In one embodiment, the system 401 may receive input 403, which may include computer code (e.g., C++) or other data. The system 401 may also include a plurality of modules, which may have one or more transfer modules 402, register/unregister modules 404, mapping/unmapping modules 406, buffer creation modules 408, truncate/expansion modules 410, and/or swapping modules 411. In one embodiment, output may be generated and output for use in block 407. It is noted that while the above-mentioned system and modules are illustratively provided, it is contemplated that other sorts of systems and modules may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for swapping out and in pinned memory regions between main memory and a separate storage location in a system, comprising:
   establishing an offload buffer in an interposing library;
   swapping out, using a swap controller, pinned memory regions by:
      transferring offload buffer data from a coprocessor memory to a host processor memory,
      unregistering and unmapping a memory region employed by the offload buffer from the interposing library, wherein the interposing library is pre-loaded on the coprocessor, and receives and stores information employed during the swapping out; and
   swapping in, using the swap controller, pinned memory regions by:
      mapping and re-registering the files to the memory region employed by the offload buffer, and
      transferring data of the offload buffer data from the host memory back to the re-registered memory region.

2. The method as recited in claim 1, wherein the separate storage is one or more of a storage level lower in a memory hierarchy than the main memory or memory attached to another processor.

3. The method as recited in claim 1, further comprising truncating files backing the memory region to zero size during the swapping out of pinned memory regions, and expanding the files backing the memory region to an original size during the swapping in.

4. The method as recited in claim 1, wherein the interposing library monitors particular function calls to collect information employed to establish storage of pinned buffers.

5. The method as recited in claim 4, wherein the interposing library exposes a swap-out function for swapping out one or a plurality of pinned memory buffers.

6. The method as recited in claim 5, wherein the swap-out function first transfers data to the separate storage location, and then unpins and releases memory allocated to buffers to be swapped out.

7. The method as recited in claim 6, wherein a swap-in function first restores the memory employed by buffers to be swapped in, pins the memory allocated to the buffers, and transfers data from the separate storage location to the main memory of the processor.

8. A system for swapping out and in pinned memory regions between main memory and a separate storage location in a system, comprising:
   a buffer creation module configured to establish an offload buffer;
   a swapping module configured to swap out pinned memory regions by employing:
      one or more transfer modules configured to transfer offload buffer data from a coprocessor memory to a host processor memory,
      one or more registration modules configured to unregister a memory region employed by the offload buffer from an interposing library, wherein the interposing library is pre-loaded on the coprocessor, and is configured to receive and store information employed during the swapping out,
      one or more mapper modules configured to unmap the memory region; and
   the swapping module being further configured to swap in pinned memory regions using:
      the one or more mapper modules, wherein the mapper modules are further configured to map the files to the memory region employed by the offload buffer,
      the one or more registration modules, wherein the registration modules are further configured to re-register the memory region to the library, and
      one or more transfer modules configured to transfer data of the offload buffer from the host memory back to the re-registered memory region.

9. The system as recited in claim 8, wherein the separate storage is one or more of a storage level lower in a memory hierarchy than the main memory or memory attached to another processor.

10. The system as recited in claim 8, further comprising one or more truncate modules configured to truncate files backing the memory region to zero size during the swapping out of pinned memory regions, and one or more expansion modules configured to expand the files backing the memory region to an original size during the swapping in.

11. The system as recited in claim 8, wherein the interposing library monitors particular function calls to collect information employed to establish storage of pinned buffers.

12. The system as recited in claim 8, wherein the interposing library exposes a swap-out function for swapping out one or a plurality of pinned memory buffers.

13. The system as recited in claim 8, wherein the swap-out function first transfers data to the separate storage location, and then unpins and releases memory allocated to buffers to be swapped out.

14. The system as recited in claim 13, wherein a swap-in function first restores the memory employed by buffers to be swapped in, pins the memory allocated to the buffers, and transfers data from the separate storage location to the main memory of the processor.

15. A method for swapping out and in pinned memory regions between main memory and a separate storage location in a system, comprising:
   establishing an offload buffer in an interposing library;
   swapping out, using a swap controller, pinned memory regions by:
      transferring offload buffer data from a coprocessor memory to a host processor memory, and
      unregistering and unmapping a memory region employed by the offload buffer from the interposing library, wherein the interposing library is pre-loaded on the coprocessor, and receives and stores information employed during the swapping out.

16. The method as recited in claim 15, further comprising swapping in, using the swap controller, pinned memory regions by:
   expanding the files backing the memory region to an original size,
   mapping the files to the memory region employed by the offload buffer,
   re-registering the memory region to the library, and
   transferring data of the offload buffer from the host memory back to the re-registered memory region.

17. The method as recited in claim 15, wherein the separate storage is one or more of a storage level lower in a memory hierarchy than the main memory or memory attached to another processor.

18. The method as recited in claim 15, wherein the interposing library monitors particular function calls to collect information employed to establish storage of pinned buffers.

19. The method as recited in claim 15, wherein the swap-out function first transfers data to the separate storage location, and then unpins and releases memory allocated to buffers to be swapped out.

20. The method as recited in claim 15, wherein a swap-in function first restores the memory employed by buffers to be swapped in, pins the memory allocated to the buffers, and transfers data from the separate storage location to the main memory of the processor.

\* \* \* \* \*